(12) United States Patent
Proni et al.

(10) Patent No.: US 6,908,221 B2
(45) Date of Patent: Jun. 21, 2005

(54) CLOSED MIXER WORKING PROCESS WITH STROKE-CONTROL RAM

(75) Inventors: Antonio Proni, Lodi (IT); Danile Balasso, Calusco D'Adda (IT); Alan Bottomley, Barton on Trent Staffordshire (GB)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/851,064

(22) Filed: May 24, 2004

(65) Prior Publication Data

US 2004/0213075 A1 Oct. 28, 2004

Related U.S. Application Data

(63) Continuation of application No. 10/073,178, filed on Feb. 13, 2002, now abandoned.
(60) Provisional application No. 60/281,789, filed on Apr. 6, 2001.

(30) Foreign Application Priority Data

Feb. 19, 2001 (EP) .............................................. 01830112

(51) Int. Cl.[7] ................................................ A21C 1/00
(52) U.S. Cl. .................................................... 366/76.7
(58) Field of Search ........................ 366/69, 76.1, 76.2, 366/76.7, 76.8; 425/204, 208, 209

(56) References Cited

U.S. PATENT DOCUMENTS

| 3,447,201 A | * | 6/1969 | Seanor et al. |
| 3,951,389 A | * | 4/1976 | Porter |
| 3,999,046 A | | 12/1976 | Porter |
| 4,057,228 A | * | 11/1977 | Volker et al. |
| 4,076,220 A | * | 2/1978 | Nakashima et al. |
| 4,455,091 A | * | 6/1984 | Bamberger et al. |
| 4,818,113 A | * | 4/1989 | Patel |
| 4,830,506 A | | 5/1989 | Borzenski |
| 5,011,291 A | * | 4/1991 | Peter |
| 5,259,670 A | * | 11/1993 | Brown |
| 5,324,107 A | * | 6/1994 | Tanaka et al. |
| 5,460,445 A | * | 10/1995 | Miyoshi et al. |
| 5,758,961 A | * | 6/1998 | Deal et al. |

(Continued)

FOREIGN PATENT DOCUMENTS

| DE | 2058 975 | | 6/1972 |
| EP | 172726 | * | 2/1986 |
| EP | 0 244 121 | | 11/1987 |
| EP | 0 845 339 | | 6/1998 |
| GB | 2163061 | * | 2/1986 |
| WO | WO 99/24230 | | 5/1999 |

OTHER PUBLICATIONS

M. Naoyuki; "Hermetically Close Type Kneader", Patent Abstracts of Japan, of JP63019206 A, Jan. 27, 1988.

(Continued)

*Primary Examiner*—Charles E. Cooley
(74) *Attorney, Agent, or Firm*—Finnegan, Henderson, Farabow, Garrett & Dunner, L.L.P.

(57) ABSTRACT

A closed mixer includes a mixing chamber, a pair of rotors, and a pressing ram. The pressing ram is moveable between a resting condition, which allows introduction of material into the mixing chamber, and a working condition. A method of processing polymer-based mixtures and compounds in the closed mixer includes introducing material into the mixing chamber, moving the pressing ram from the resting condition to an upper end-of-stroke position, and moving the pressing ram from the upper end-of-stroke position to a lower end-of-stroke position. A position-time profile of the pressing ram is controlled during moving the pressing ram from the upper end-of-stroke position to the lower end-of-stroke position.

14 Claims, 7 Drawing Sheets

U.S. PATENT DOCUMENTS

| | | | |
|---|---|---|---|
| 5,783,983 A | * | 7/1998 | Ureshino et al. |
| 5,865,535 A | | 2/1999 | Edwards |
| 6,312,148 B1 | * | 11/2001 | Deal et al. |
| 6,313,212 B1 | * | 11/2001 | Caretta et al. |
| 6,726,352 B2 | * | 4/2004 | Proni et al. |
| 2002/0068774 A1 | * | 6/2002 | Hotellier et al. |
| 2002/0159327 A1 | * | 10/2002 | Proni et al. |
| 2004/0085851 A1 | * | 5/2004 | Campanelli et al. |
| 2004/0096385 A1 | * | 5/2004 | Proni et al. |
| 2004/0213075 A1 | * | 10/2004 | Proni et al. |

OTHER PUBLICATIONS

M. Naoyuki; "Hermetically Close Type Kneader", Patent Abstracts of Japan, of JP63019207 A, Jan. 27, 1988.

* cited by examiner

| Time(secs) | Ram position(mm) |
|---|---|
| 1 | 1368 |
| 2 | 1292 |
| 3 | 616 |
| 4 | 280 |
| 5 | 280 |
| 6 | 120 |
| 7 | 82 |
| 8 | 94 |
| 9 | 94 |
| 10 | 90 |
| 11 | 89 |
| 12 | 81 |
| 13 | 67 |
| 14 | 67 |
| 15 | 71 |
| 16 | 60 |
| 17 | 59 |
| 18 | 97 |
| 19 | 97 |
| 20 | 73 |
| 21 | 75 |
| 22 | 77 |
| 23 | 68 |
| 24 | 68 |
| 25 | 60 |
| 26 | 54 |
| 27 | 73 |
| 28 | 80 |
| 29 | 60 |
| 30 | 37 |
| 31 | 67 |
| 32 | 48 |
| 33 | 55 |
| 34 | 55 |
| 35 | 55 |
| 36 | 47 |
| 37 | 45 |
| 38 | 45 |
| 39 | 45 |
| 40 | 44 |
| 41 | 36 |
| 42 | 20 |
| 43 | 39 |
| 44 | 39 |
| 45 | 17 |
| 46 | 19 |
| 47 | 28 |
| 48 | 28 |
| 49 | 12 |
| 50 | 11 |
| 51 | 10 |
| 52 | 13 |
| 53 | 13 |
| 54 | 3 |
| 55 | 3 |
| 56 | 9 |
| 57 | 0 |

FIG. 4

CLOSED MIXER WORKING PROCESS WITH STROKE-CONTROL RAM

CROSS-REFERENCE TO RELATED APPLICATIONS

This application is a continuation of U.S. patent application Ser. No. 10/073,178, filed Feb. 13, 2002 (now abandoned); additionally, Applicants claim the right of priority under 35 U.S.C. § 119(a)–(d) based on patent application No. 01830112.7, filed Feb. 19, 2001, in the European Patent Office; further, Applicants claim the benefit under 35 U.S.C. § 119(e) based on prior-filed, copending provisional application No. 60/281,789, filed Apr. 6, 2001, in the U.S. Patent and Trademark Office; the contents of all of which are relied upon and incorporated herein by reference.

BACKGROUND OF THE INVENTION

1. Field of the Invention

The present invention generally relates to the processing of polymer compounds and mixtures in a mixer of the closed type.

This kind of processing is commonly performed in the manufacture of tyres or components thereof such as tread bands and the like; such processing consists of mixing a polymer base together with other ingredients according to predetermined recipes, in order to obtain semi-finished products to be used in the subsequent phases of the manufacturing cycle.

2. Description of the Related Art

Closed mixers, also known as discontinuous mixers, are substantially formed by a mixing chamber accommodating a pair of rotors rotating in mutually opposite directions, wherein the material is loaded in predefined quantities (batches) and processed by the rotors which completely discharge it from the mixer at the end of the cycle, before beginning to process a new batch of material.

In this connection it should be considered that the term "mixture" in this description is intended to indicated the generic intermediary product obtained during any phase of the processing cycle, while the term "compound" will be used to refer to the semi-finished product derived from the addition of the cross-linking system to the mixture in order to prepare it for subsequent vulcanization.

The chemical-physical characteristics of the mixtures and the compounds, which allow an end product with desired qualities to be obtained, depend also on the processing in the closed mixers; for this reason the control of this operating phase has a decisive role in the manufacture of tyres and their components.

The process variables which influence the working process in closed mixers are many and it is therefore difficult to ensure an adequate control thereof throughout the whole operating cycle, i.e. from the filling of the mixer to its emptying.

Examples of these process variables are the characteristics of the ingredients used for compounds and mixtures, their temperature, the speed and the torque applied to the rotors, the filling level of the mixer (i.e. the so-called "fill factor") and others.

Nowadays various mixing control systems are known, which are based on the detection over time of certain process parameters (also called "indirect" parameters), such as the temperature of the mixtures or the energy conferred to the system, and on the eventual correction thereof by modifying other parameters (also called "direct" parameters) which directly determine the functioning of the mixer, such as, for example, the speed of the rotors, the pressure of the pressing ram and so on.

Examples of this procedure are described in international patent application No. PCT/US98/23294 and in U.S. Pat. No. 4,830,506.

In particular the latter describes a system for controlling processing in a closed mixer, based on regulating the pressure of the pressing ram so as to ensure that when the ram is in the lowered operating position, it can oscillate with a small predetermined amplitude (in the order of half an inch, i.e. approximately 12.5 mm).

According to this US patent, with such a control system it is possible to obtain an improved mixing action by making use of the periodic rebounds due to the rotation of the rotors.

One characteristic of compounds and mixtures which, until nowadays, closed mixers and their regulating systems did not control efficiently, is the dispersion of the various ingredients within the processed mass.

This characteristic is of considerable importance for obtaining an end product with the required qualities, both because a non-homogenous dispersion of an ingredient in the mixed material can cause local defects in the tyre or semi-finished product which will be manufactured, and because a different dispersion between one charge of material processed in the mixer and the subsequent one, can result in lack of uniformity between "batches" with the same basic formulation and can negatively influence the repeatability of the rheometric curve of the compound.

SUMMARY OF THE INVENTION

The present invention aims at providing a method for regulating the working process in a closed mixer, which allows a better and more constant dispersion of the ingredients in the processed mass to be obtained.

The invention arises from the Applicant's perception that said dispersion also depends on the profile of the position over time of the pressing ram, during the phase of incorporation of the materials in the polymer matrix.

The invention applies preferably, but not exclusively, to the incorporation phase of the reinforcing filler in the polymer; as "reinforcing filler" is intended here both the carbon black commonly used in the manufacture of tyres and the so-called white fillers with their optional bonding agents.

Said fillers are ingredients of the inorganic type such as gypsum, talc, kaolin, bentonite, titanium dioxide, alumina, various silicates and silica, which are used for tyre compounds in order to increase grip in the wet conditions, reduce the rolling resistance of the tyre and other purposes.

The invention also applies to the addition of the crosslinking system to the mixtures in order to obtain compounds to be vulcanized, as well as to the mixing of mixtures having different compositions and, more generally, whenever it is required to combine the polymer matrix with substantially solid material introduced into the mixer during processing.

According to the invention, the downward stroke of the ram after the introduction of the material into the mixer is performed by controlling the descent position-time profile thereof during the incorporation phase in the polymer, in such a way as to follow a predetermined reference pattern: this allows to achieve a controlled position of the ram, which gives time to the rotors for mixing the ingredients before the ram reaches the working condition at the end of its stroke.

The term "position-time profile" in this description and in the following claims, is intended to refer the profile over time of the position of the pressing ram; said profile can easily be represented graphically, by plotting in a Cartesian plane the position of the ram on the ordinate and the time on the abscissa

BRIEF DESCRIPTION OF THE DRAWINGS

Further features and advantages of the invention will emerge more clearly from the description given here below with reference to the accompanying drawings, of a preferred but non-exclusive embodiment thereof.

In particular, the first figure of the drawings shows a mixer of the closed type for carrying out the method of the invention.

FIG. 4 is a table showing the position of the pressing ram as a function of time, during the phase of incorporation of the filler in the polymer matrix which takes place in the processing cycle of FIGS. 2 and 3.

Last.

DETAILED DESCRIPTION OF THE EXEMPLARY EMBODIMENTS

Figure 1:
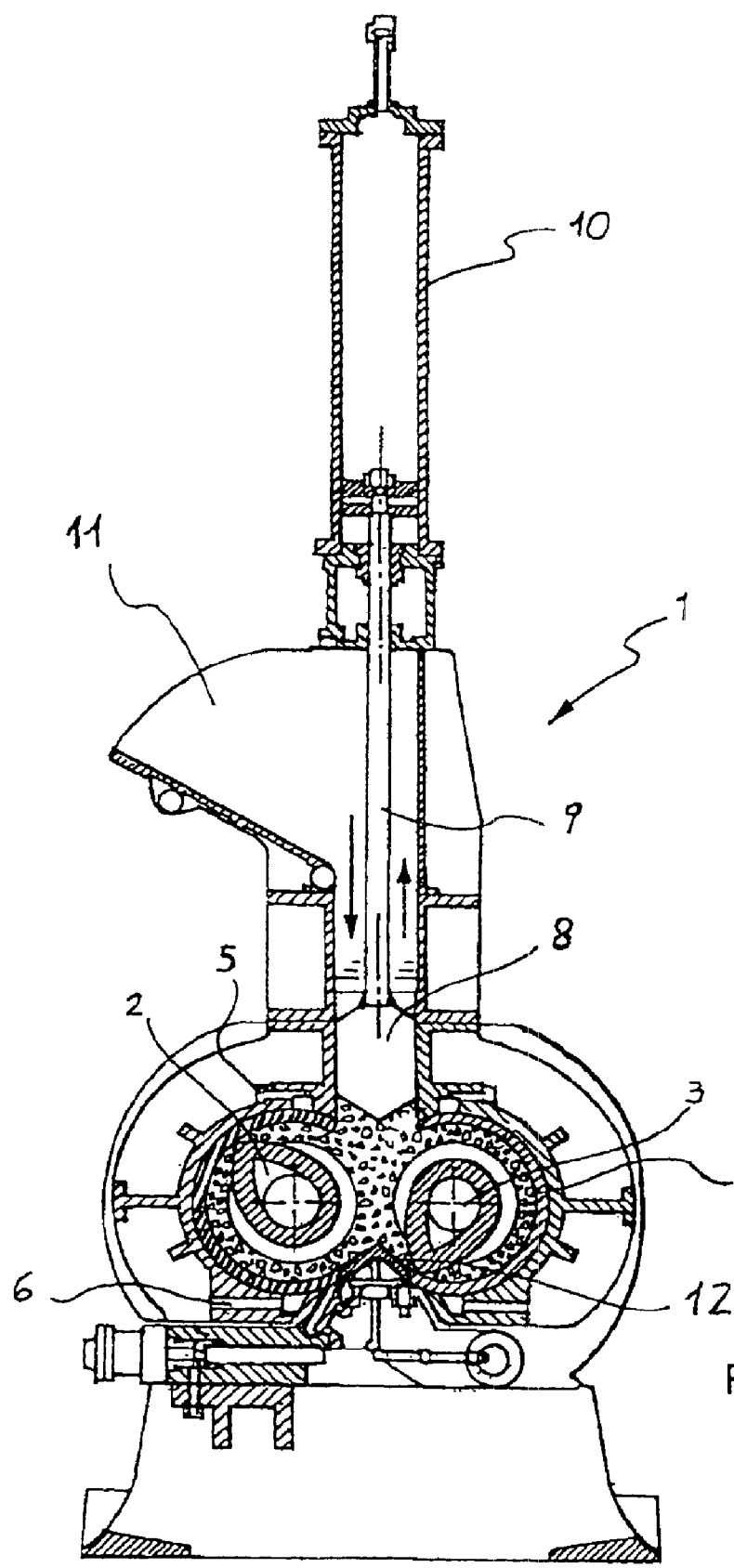

With reference to the first figure, the mixer 1 shown therein is of the so-called "Banbury®" type which comprises a pair of tangential rotors 2 and 3 rotating in opposite directions inside a mixing chamber 4, cooled by water circulating in a series of channels 5, 6.

The mixer 1 comprises the pressing ram 8 fixed to the end of a rod 9 actuated by a pneumatic (or hydraulic) cylinder 10.

The mixer 1 is further provided, for introduction inside it of the material to be processed, with a lateral hopper 11, whereas discharging of the processed mixtures or compounds takes place from below, through an opening present in the base of the mixing chamber 4 and closed by an obturator device 12.

In the mixer 1 the position of the pressing ram 8 and the rod 9 which actuates it is detected in a way known per se with transducers, not shown in the drawings; according to the invention said position is detected throughout the whole stroke of the pressing ram, from the raised (resting) condition thereof in which it allows charging the material via the hopper 11, to the lowered (working) condition.

As lowered (working) condition is intended the distance between the point at which the pressing ram meets the compound and the lowest point that can be reached by said ram, depending on the filling level of the mixing chamber and on the physical characteristics of the compound being processed. These two extremes are respectively called the upper and lower end-of-stroke positions.

In this way it is possible to determine the downward speed of the pressing ram throughout its stroke and to regulate said speed, as will be explained more clearly hereinafter, by means of the general control system of the mixer which for this purpose comprises electronic means (of the PLC type and the like) known per se.

The graphs in FIGS. 2 and 3 refer to the processing of a typical mixture for compounds reinforced with silica, whose the composition is given below by way of example, specifying the ranges of variation for each ingredient and expressing the quantities in "phr", i.e. parts by weight for each 100 parts of polymeric material:

| | |
|---|---|
| Polymer base | 100 |
| Carbon black | 0–80 |
| Silica | 10–80 |
| Bonding agent (of the silica) | 4%–15% of the silica |
| Zinc oxide (ZnO) | 1–3 |
| Stearic acid | 0–3 |
| Anti-deteriorating agents | 1–3 |
| Plasticizing oil | 0–30 |
| Anti-ozone wax | 0.5–3 |
| Specific chemical ingredients | 0–15 |

In order to obtain the compounds, it will be necessary to add to these ingredients the crosslinking system in the usual quantities according to the composition of the mixture; said system is preferably composed of sulphur (from 0.5 to 2.5 phr) and vulcanization accelerators.

The polymer base can be any polymer or mixture of polymers, either of natural or synthetic type, suitable to assume all the chemicophysical and mechanical characteristics of the elastomers after appropriate crosslinking.

Preferred polymer bases include polymers or co-polymers with an unsaturated chain, obtained through the polymerisation of conjugated dienes and/or aliphatic or aromatic vinyl monomers.

Figure 2:
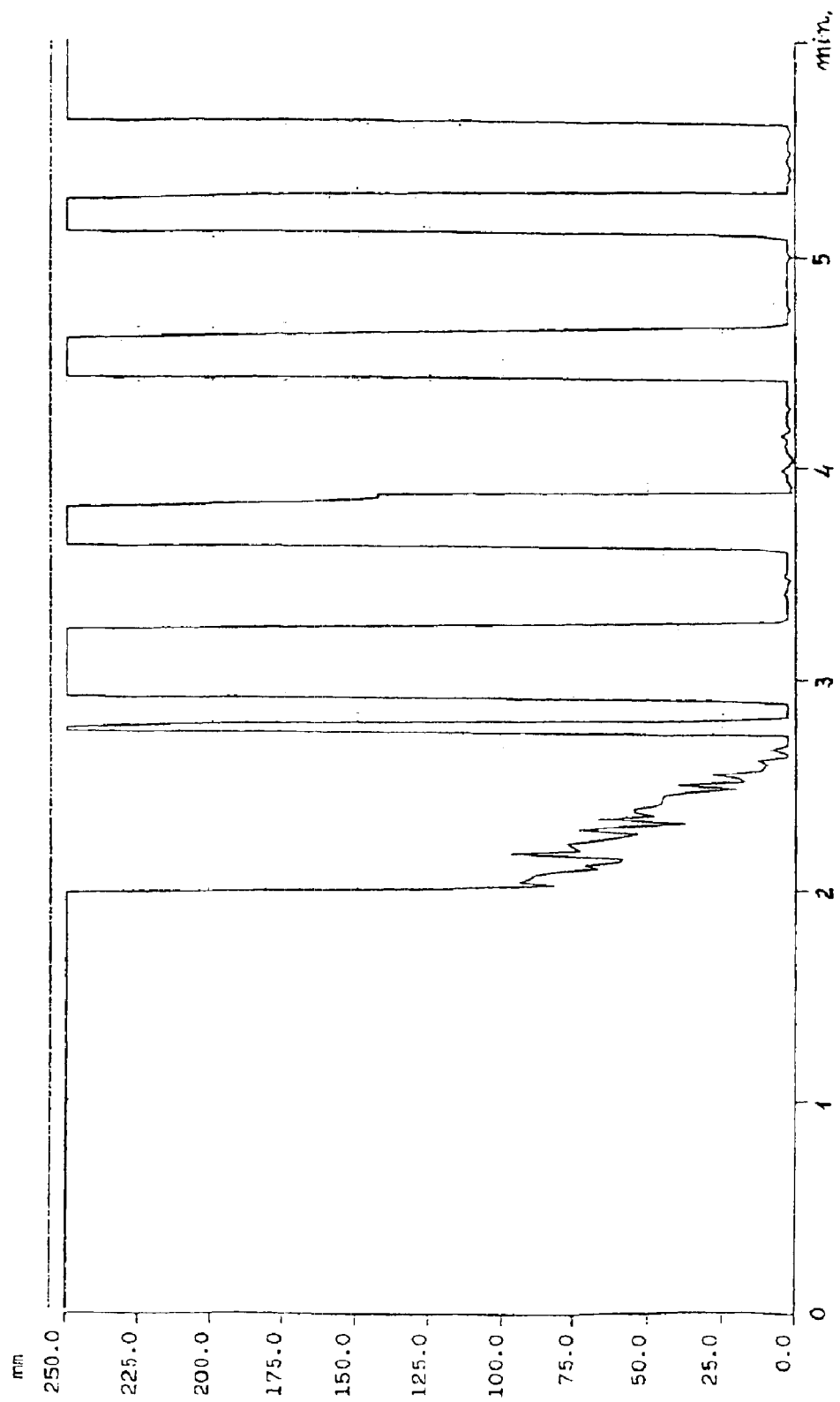
FIG. 2 is a graph showing the profile over time of the position of the pressing ram, during a working cycle according to the invention.
Figure 3:
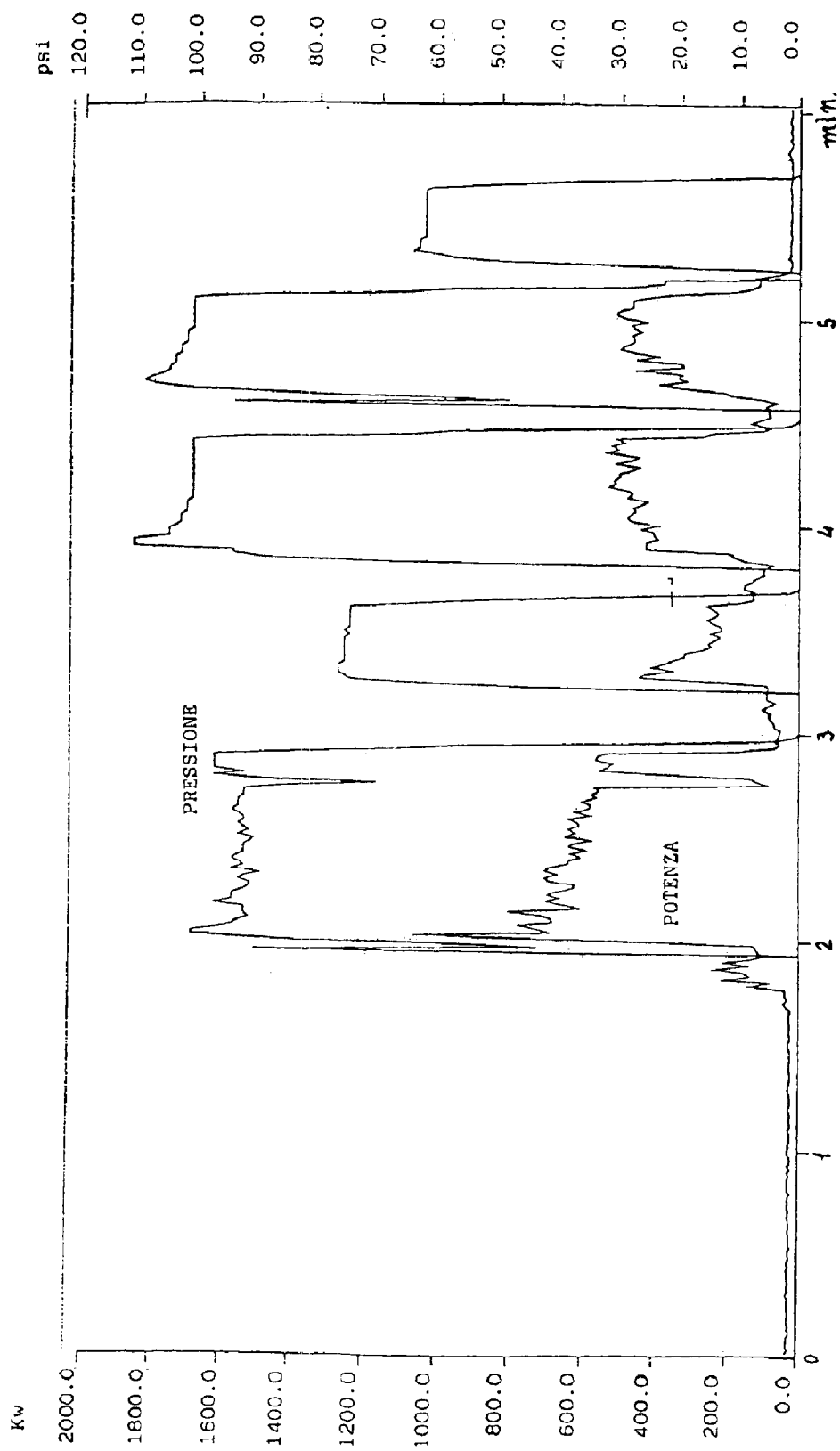
FIG. 3 is a graph showing the profile over time of the power applied to the mixer and the operating pressure of the pressing ram, during the same working cycle of FIG. 2.

In the example referred to in FIGS. 2 and 3, the polymer mass weighs 113.7 kg (with a dry content equal to 94.08 kg) and is mixed together with a reinforcing filler comprising, in addition to carbon black, silica.

The overall weight of the reinforcing filler is 68.2 kg, wherein the silica constitutes 58% which is bonded to the polymer base by means of known elements such as silane.

In the example, the processed mass also comprises 8 kg of free oil and 21.15 kg of other ingredients present in smaller percentages such as, typically, silane or other bonding agent of silica, zinc oxide, stearic acid and anti-deteriorating agents, in such a way as to obtain a fill factor of the mixer equal to 67.7%.

The latter is defined by the ratio between the mass present in the mixer (211 kg in the example) and the capacity of the mixer (equal to 270 liters) multiplied by the density of the aforementioned mass (1.154 kg/dm$^3$).

The processing cycle referred to in the graphs of FIGS. 2 and 3, is divided into successive phases which can be identified from the time on abscissa.

In this way at the start, the rotors 2 and 3 of the mixer 1 are brought up to a predetermined average speed of 40 revolutions/minute, for the initial introduction of the ingredients into the hopper 11 (interval from 0 to 2 min. about); in this condition the pressing ram 8 is fully raised to allow the passage of the ingredients towards the mixing chamber 4.

Once the loading phase has been completed, the ram 8 is lowered: this operation is performed by controlling the pressure applied by the actuating fluid (oil or gas) on the pressing ram, in such a way as to follow a predetermined absolute position-time.

The subsequent positions of the ram as a function of time (calculated in seconds from the start of the descent of the ram) are summarised in the table in FIG. 4, and the data relating thereto is shown in graphical form in FIG. 2.

As can be seen, in this example initially the descent occurs very quickly (over 1,250 mm in 6 seconds), until the ram meets the mass of the ingredients introduced into the mixer.

At this point, control of the pressure applied by the operating fluid on the pressing ram is initiated, as a function of the position thereof: the ram begins therefore to descend in gradual manner with a controlled feed movement of 90 mm in 45 seconds.

In this connection it is worth to explain that reference is made to an average forward movement of the ram, because the real movement thereof is characterised by successive oscillations (visible in the diagram of FIG. 2) caused by the mass introduced into the mixing chamber, which is subject to a periodic movement imparted by the rotation of the rotors that superposes to the downward linear movement of the ram.

The position of the latter is regulated by adjusting the pressure of the fluid in the actuating cylinder 10; this regulation is controlled by the mixer control system, which in this phase regulates the pressure applied to the pressing ram and causes said ram to move downwards with a predetermined position profile, whose gradient (i.e. the degree of displacement per unit of time) is set out in the recipe.

In this way the position over time of the ram is used as a process control parameter, in addition to those parameters already known, such as temperature, pressure applied to the pressing ram, power, etc.

The abovementioned position also supplies information on the compaction curve of the material which, as is known, is correlated to incorporation of the polymer in the chamber.

In this manner it also becomes possible to identify the optimum time for addition of the plasticizing ingredients, following incorporation of the filler.

When the pressing ram 8 reaches the working condition, mixing of the mixture proceeds according to the usual criteria which will depend in each case on the semi-finished product to be obtained.

The graph in FIG. 2 shows the position-time profile of the position of the ram for an operating cycle; said position is expressed as a distance in millimeters (mm) from a predetermined reference point, which in this case is the lowered working condition, while the time is in minutes.

FIG. 3, on the other hand, shows the graphs of the pressure applied to the pressing ram for actuation thereof and the instantaneous power used by the rotors, during the same operating cycle of FIG. 2; the units of measurement are psi for pressure, kW for power and minutes for time.

As can be seen, in the phases subsequent to that of introduction of the ingredients considered above, the ram is raised and lowered quickly between the upper and lower end-of-stroke positions, because the further introduction of other material to be mixed is not scheduled. However, this possibility should not be excluded and, in such a case, lowering of the rain will still be performed in controlled manner as already explained.

The results obtained with the processing method according to the invention have been rather favourable.

Indeed, upon performing laboratory tests on mixture samples according to the above example (using the reflected light technique and the "Dispergrader 1000" system made by Optigrade), it was possible to ascertain that the dimensions and the number of aggregates present in the processed mass were lower with respect to a mixture obtained with the same process in which, however, lowering of the pressing ram did not take place in a controlled manner according to the teaching of the invention.

Figure 5:
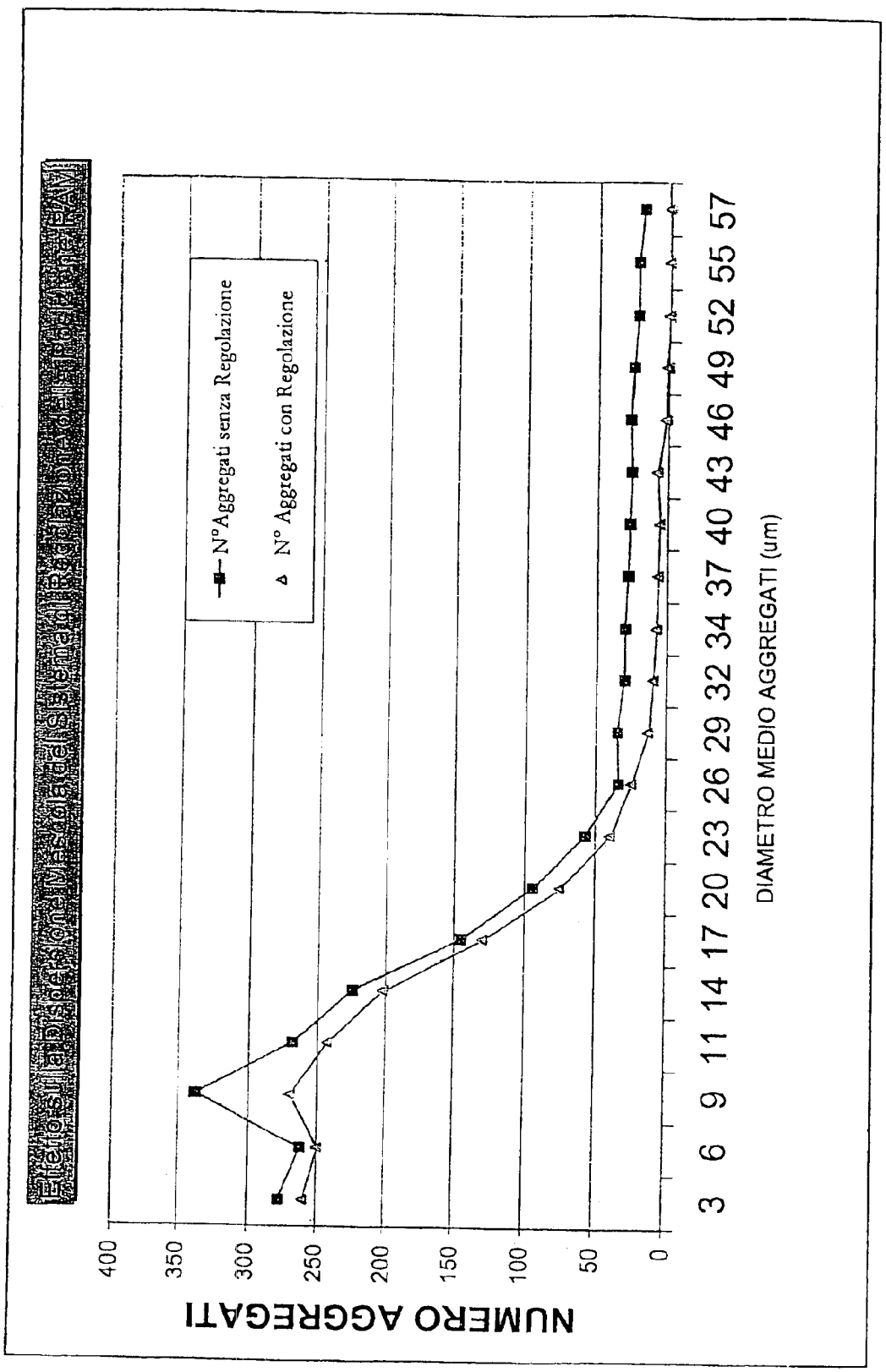
FIG. 5 shows an explicative graph of the effects, on dispersion, of the method according to the invention.

For this purpose, reference is made to the graph in FIG. 5 obtained on the basis of the aforementioned tests, where the ordinates show the number of aggregates having a specific average diameter, shown on the abscissas.

As can be seen, the curve relating to the mixture processed according to the invention has for each average diameter value a number of aggregates which is systematically lower than that of the mixture processed normally, i.e. without control of the descent of the pressing ram.

Furthermore, with the method according to the invention, aggregates with an average diameter greater than 50 $\mu$m are almost completely eliminated. For a given mixture, after moving the pressing ram from the upper end-of-stroke position to the lower end-of-stroke position, substantially all aggregates in the mixture comprise an average diameter less than or equal to 55 $\mu$m. Additionally, for the given mixture, after moving the pressing ram from the upper end-of-stroke position to the lower end-of-stroke position, all aggregates in the mixture may comprise an average diameter less than or equal to 55 $\mu$m.

Of course variations of the invention with respect to what has been described hitherto, are possible.

In the first place it is necessary to point out that the processing method considered can be used in all mixers of the closed type (for example also those with intermeshing rotors) provided with a pressing ram.

Furthermore, as mentioned above, control of the downward stroke of the pressing ram must not be regarded as applicable only to dispersion of the reinforcing filler, but can also be performed during all the processing phases which require dispersion of other materials in the polymer mass, such as the addition of the crosslinking system to the mixtures in order to obtain compounds to be vulcanized, or the mixing of mixtures of different compositions carried out by adding one of them to the mixture already present in the mixer, and so on.

However, implementation of the method according to the invention in relation to the reinforcing filler is particularly advantageous because, in addition to the improved dispersion already mentioned above, it also allows addition of the plasticizing substances to be optimised.

In this respect it is necessary to point out that in the prior art, since the phase of incorporation of the filler is performed without controlling the position of the ram and with the use of conventional parameters such as temperature, energy and power, execution thereof occurs over a predetermined time span (typically in the region of 1 min.), at the end of which it is assumed that incorporation is completed.

The result is that, without any control, the ram can reach the working condition either before or after the abovementioned time span.

In the first case a loss of specific power occurs: this means that there is a dead time which could be used to add the plasticizing substances, but which is not used for this purpose because there is not sufficient certainty that incorporation of the filler has finished.

By lowering the ran controlling its position over time on the basis of a predetermined feed speed as in the present invention, it is possible to ensure that the incorporation of the filler finishes exactly when the ram reaches the lowered working condition, so as to bring it back into the raised resting condition afterwards and introduce the plasticizers.

In the second case, on the other hand, since the ram reaches the working condition too late, a loss of material can occur as a result of the suction when said ran is raised to start the subsequent processing phase, for example cleaning thereof or the introduction of plasticizers.

In both cases mixing of the processed material is affected.

Figure 6:
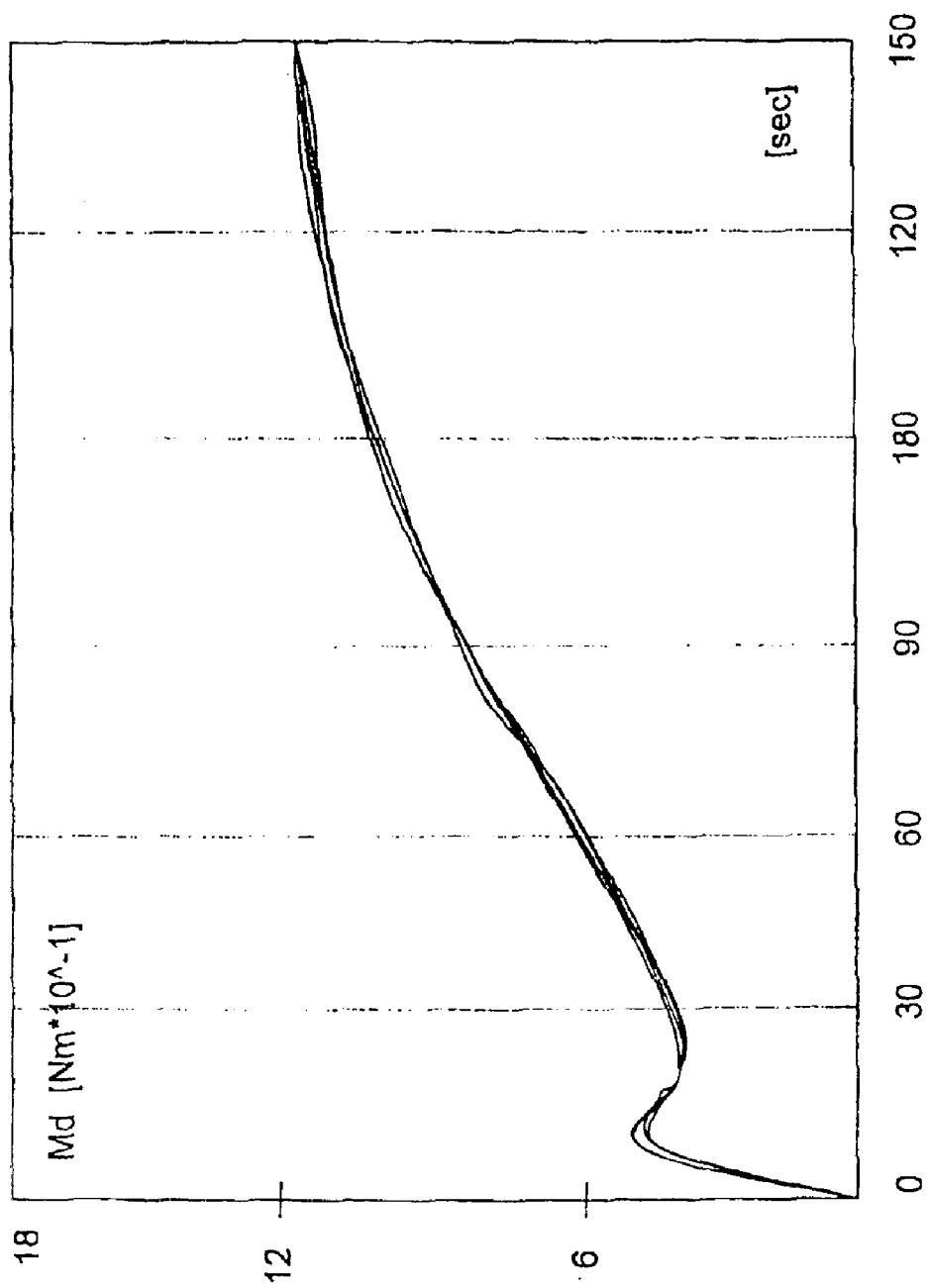
FIGS. 6 and 7 are the rheometric curves of compounds processed, respectively, with the method of the invention and according to the prior art.
Figure 7:
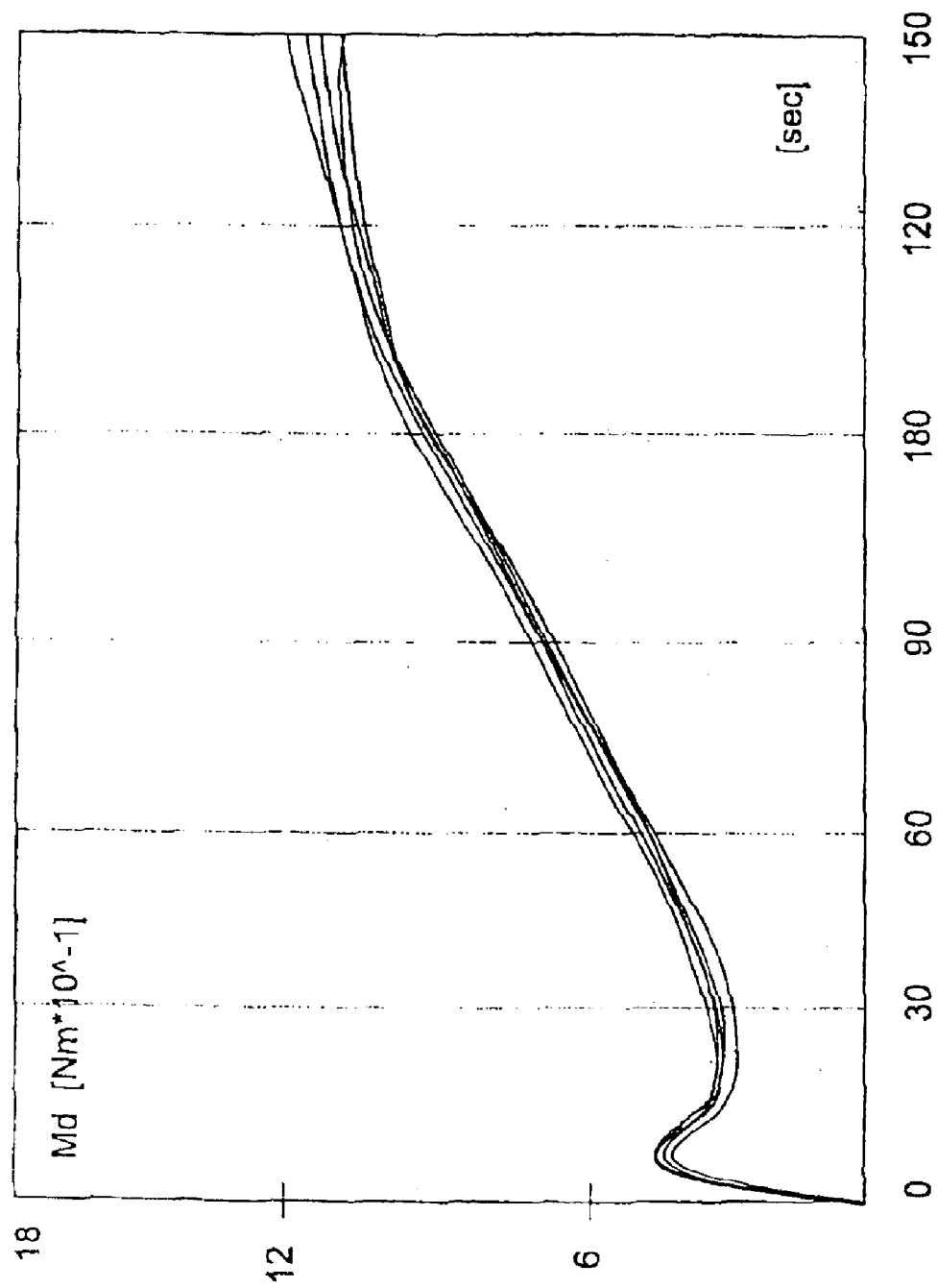

The consequences of this situation are shown in FIG. 7 compared with FIG. 6. They show the rheometric curves relating to compounds according to the above recipe being obtained by controlling the pressing ram with the method of the present invention (FIG. 6) and operating in accordance with the prior art (FIG. 7).

As can be seen, while in the case of the method of this invention the various curves plotted on the graph in FIG. 6 have a rather uniform trend, in the case of the prior art (FIG. 7) there is a certain dispersion of the values obtained.

What is claimed is:

1. A method of processing polymer-based mixtures and compounds in a closed mixer, wherein the mixer comprises:
    a mixing chamber;
    a pair of rotors; and
    a pressing ram;
    wherein the pressing ram is movable between a resting condition, which allows introduction of material into the mixing chamber, and a working condition,
    wherein the method comprises:
        introducing the material into the mixing chamber;
        moving the pressing ram from the resting condition to an upper end-of-stroke position; and
        moving the pressing ram from the upper end-of-stroke position to a lower end-of-stroke position;
    wherein a position-time profile of the pressing ram is controlled during moving the pressing ram from the upper end-of-stroke position to the lower end-of-stroke position,
    wherein moving the pressing ram from the resting condition to the upper end-of-stroke position is preceded by introduction of at least one reinforcing filler of a polymer base into the mixing chamber, and
    wherein moving the pressing ram from the upper end-of-stroke position to the lower end-of-stroke position occurs during incorporation of the at least one reinforcing filler into the polymer base.

2. The method of claim 1, wherein control of the position-time profile of the pressing ram is initiated when the pressing ram contacts the material.

3. The method of claim 1, wherein the position-time profile of the pressing rain is controlled by regulating a control pressure of the pressing ram to follow a predetermined reference position-time profile.

4. The method of claim 1, wherein the position-time profile of the pressing ram is a direct process parameter.

5. The method of claim 1, wherein the position-time profile of the pressing rain is predetermined.

6. The method of claim 1, wherein the pressing ram reaches the lower end-of-stroke position at an end of incorporation of the at least one reinforcing filler into the polymer base.

7. The method of claim 6, wherein plasticizers of the polymer base are introduced into the mixing chamber after the pressing ram has reached the lower end-of-stroke position.

8. The method of claim 1, wherein the at least one reinforcing filler comprises one or more of carbon black and silica.

9. The method of claim 1, wherein for a given mixture, after moving the pressing ram from the upper end-of-stroke position to the lower end-of-stroke position, aggregates in the mixture with an average diameter greater than 50 $\mu$m are almost completely eliminated.

10. The method of claim 1, wherein for a given mixture, after moving the pressing ram from the upper end-of-stroke position to the lower end-of-stroke position, substantially all aggregates in the mixture comprise an average diameter less than or equal to 55 $\mu$m.

11. The method of claim 1, wherein for a given mixture, after moving the pressing ram from the upper end-of-stroke position to the lower end-of-stroke position, all aggregates in the mixture comprise an average diameter less than or equal to 55 $\mu$m.

12. The method of claim 1, wherein the material introduced into the mixing chamber comprises a crosslinking system for a polymer-based mixture.

13. The method of claim 1, wherein the material introduced into the mixing chamber comprises a mixture.

14. The method of claim 1, wherein during moving the pressing ram from the upper end-of-stroke position to the lower end-of-stroke position, motion of the pressing ram is subject to oscillations caused by effects of rotation of the rotors on the material.

* * * * *

UNITED STATES PATENT AND TRADEMARK OFFICE
CERTIFICATE OF CORRECTION

PATENT NO. : 6,908,221 B2
DATED : June 21, 2005
INVENTOR(S) : Antonio Proni et al.

It is certified that error appears in the above-identified patent and that said Letters Patent is hereby corrected as shown below:

Title page,
Item [75], Inventors, "Danile Balasso," should read -- Daniele Balasso, --.

Column 8,
Lines 2 and 8, "pressing rain" should read -- pressing ram --.

Signed and Sealed this

Twenty-seventh Day of September, 2005

JON W. DUDAS
*Director of the United States Patent and Trademark Office*